United States Patent
Naslavsky et al.

(10) Patent No.: US 8,595,718 B1
(45) Date of Patent: Nov. 26, 2013

(54) METHOD AND SYSTEM FOR GENERATING A KNOWLEDGE PACKAGE

(75) Inventors: Ilan Naslavsky, Tel Aviv (IL); Yuval Turgeman, Rishon Lezion (IL)

(73) Assignee: Oracle America, Inc., Redwood City, CA (US)

(*) Notice: Subject to any disclaimer, the term of this patent is extended or adjusted under 35 U.S.C. 154(b) by 1596 days.

(21) Appl. No.: 11/840,489

(22) Filed: Aug. 17, 2007

(51) Int. Cl.
*G06F 9/445* (2006.01)
*G06F 9/44* (2006.01)
*G06F 17/30* (2006.01)

(52) U.S. Cl.
USPC ............ 717/174; 717/120; 707/710; 707/776

(58) Field of Classification Search
None
See application file for complete search history.

(56) References Cited

U.S. PATENT DOCUMENTS

| | | | | |
|---|---|---|---|---|
| 5,935,210 | A * | 8/1999 | Stark | 709/224 |
| 6,304,864 | B1 * | 10/2001 | Liddy et al. | 706/15 |
| 6,785,683 | B1 * | 8/2004 | Zodik et al. | 1/1 |
| 7,181,454 | B1 * | 2/2007 | McClamroch et al. | 1/1 |
| 7,761,395 | B2 * | 7/2010 | Wookey | 706/45 |
| 7,865,874 | B2 * | 1/2011 | Wookey | 717/120 |
| 8,225,292 | B2 * | 7/2012 | Naslavsky et al. | 717/126 |
| 8,438,559 | B2 * | 5/2013 | Naslavsky et al. | 717/174 |
| 2004/0154000 | A1 * | 8/2004 | Kasravi et al. | 717/130 |
| 2004/0250246 | A1 * | 12/2004 | Veselov et al. | 717/169 |
| 2005/0144619 | A1 * | 6/2005 | Newman | 717/177 |
| 2006/0074936 | A1 * | 4/2006 | Behrens | 707/100 |
| 2007/0169079 | A1 * | 7/2007 | Keller et al. | 717/168 |
| 2009/0265586 | A1 * | 10/2009 | Fitoussi et al. | 714/48 |
| 2009/0265690 | A1 * | 10/2009 | Naslavsky et al. | 717/126 |
| 2009/0265701 | A1 * | 10/2009 | Naslavsky et al. | 717/172 |
| 2011/0055811 | A1 * | 3/2011 | Ananthanarayanan et al. | 717/120 |

OTHER PUBLICATIONS

Yaeli, A., et al. "Asset Locator—A Framework for Enterprise Software Asset Management." The Israeli Workshop of Programming Languages and Development Environments [online], 2002 [retrieved Feb. 27, 2012]. Retrieved from Internet: <http://citeseerx.ist.psu.edu/viewdoc/summary?doi=10.1.1.18.3649>, pp. 1-12.*

* cited by examiner

*Primary Examiner* — Don Wong
*Assistant Examiner* — Todd Aguilera
(74) *Attorney, Agent, or Firm* — Osha • Liang LLP (57) ABSTRACT

A computer system in accordance with one or more embodiments of the invention includes one or more data miners configured to mine software deliverables for metadata, a metadata filter configured to generate a filtered view of metadata associated with a subset of the software deliverables, an inventory generator configured to generate an inventory of the subset, a rules manager configured to generate rules using the filtered view and the inventory, where the rules are based on software relationships within the subset, and a package generator configured to generate a knowledge package based on the rules, where the knowledge package includes guidelines for obtaining the subset and installing the subset.

13 Claims, 5 Drawing Sheets

METHOD AND SYSTEM FOR GENERATING A KNOWLEDGE PACKAGE

BACKGROUND

Computer systems typically operate according to instructions encoded in software. To make the instructions accessible to a computer system, the software is first installed on a computer-readable medium such as a compact disc, a disk drive, flash memory, network-attached storage (NAS), etc. The instructions are then loaded into the computer system's memory from the computer-readable medium and subsequently executed by the computer system's processor(s).

In many cases, software includes multiple subcomponents. Some or all of these subcomponents may depend on each other's presence in the computer system's memory to function correctly. Further, some subcomponents may be incompatible with each other, or may be compatible only with particular versions of each other. Therefore, for the software to function correctly, the correct subcomponents are generally required. Incorrect combinations of subcomponents may result in unexpected results such as invalid data, memory faults, system crashes, etc.

Determining the correct subcomponents for software is typically a manual task, requiring a user to correctly identify the dependencies and incompatibilities between individual subcomponents. Depending on the number of subcomponents, this task can be daunting, even for those developing the software. For example, multiple versions of subcomponents may exist, and the dependencies and incompatibilities between subcomponents may not be immediately apparent.

Further, obtaining those subcomponents may be a complicated task in itself, especially if all the subcomponents are not accessible from a single source. The user may effectively be required to not only know the dependencies and incompatibilities between subcomponents, but also where to obtain those subcomponents. Therefore, the ability to obtain and install software sometimes requires a breadth of knowledge and technical expertise not available to a typical user.

SUMMARY

In general, in one aspect, the invention relates to a computer system. The computer system comprises at least one data miner configured to mine a plurality of software deliverables for metadata, a metadata filter configured to generate a filtered view of metadata associated with a subset of the plurality of software deliverables, an inventory generator configured to generate an inventory of the subset, a rules manager configured to generate a plurality of rules using the filtered view and the inventory, wherein the plurality of rules is based on a plurality of software relationships within the subset, and a package generator configured to generate a knowledge package based on the plurality of rules, wherein the knowledge package comprises guidelines for obtaining the subset and installing the subset.

In general, in one aspect, the invention relates to a system. The system comprises means for mining a plurality of software deliverables for metadata, means for generating a filtered view of metadata associated with a subset of the plurality of software deliverables, means for generating an inventory of the subset, means for generating a plurality of rules using the filtered view and the inventory, wherein the plurality of rules is based on a plurality of software relationships within the subset, and means for generating a knowledge package based on the plurality of rules, wherein the knowledge package comprises guidelines for obtaining the subset and installing the subset.

In general, in one aspect, the invention relates to a method for generating a knowledge package. The method comprises mining a plurality of software deliverables for metadata, generating a filtered view of metadata associated with a subset of the plurality of software deliverables, generating an inventory of the subset, generating a plurality of rules using the filtered view and the inventory, wherein the plurality of rules is based on a plurality of software relationships within the subset, and generating a knowledge package based on the plurality of rules, wherein the knowledge package comprises guidelines for obtaining the subset and installing the subset.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating a knowledge package including guidelines for obtaining and installing a subset of software deliverables. In one or more embodiments, generating the knowledge package involves mining software deliverables for metadata describing relationships (e.g., dependencies, conflicts, etc.) between the software deliverables. The composition of the knowledge package is based at least in part on these relationships. Further, in one or more embodiments, the subset of software deliverables is a closed subset—that is, the subset fully satisfies the dependencies of the individual software deliverables included in the subset.

As discussed herein, software deliverables may include many different types of data associated with a software package such as an operating system, an operating system patch, an operating system update, a software application, a software application patch, a software application update, etc. Specifically, software deliverables may include source code, executable files, user guides, readme files, change logs, application data, multimedia files, hypertext markup language (HTML), any other similar type of software deliverable, or any combination thereof.

Figure 1:
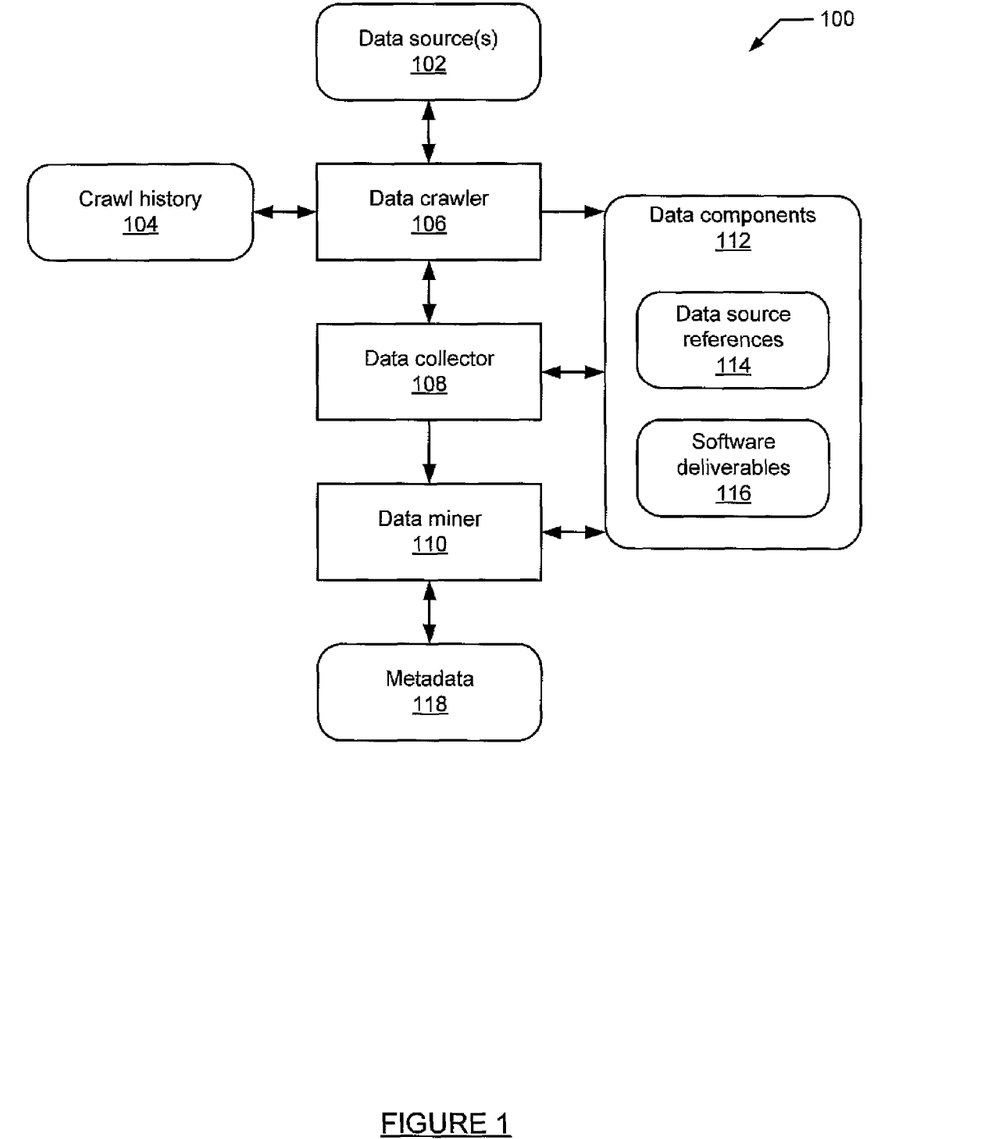
FIGS. 1-4 show diagrams of systems in accordance with one or more embodiments of the invention.

FIG. 1 shows a diagram of a system (100) in accordance with one or more embodiments of the invention. In one or more embodiments, the system (100) includes a data crawler (106) configured to crawl one or more data source(s) (102) to obtain data components (112). 'Crawling' is a term of art referring to a broad category of automated methods and systems for accessing and analyzing data. The data source(s) (102) may include one or more web pages, file transfer protocol (FTP) servers, compact discs, databases, newsgroups, any other similar type of local or remote data source, or any combination thereof.

In one or more embodiments, the data components (112) stored by the data crawler (106) include copies of software deliverables (116) found at the data source(s) (102), or portions thereof, and may also include data source references (114) identifying the data source(s) (102) where each of the software deliverables (116) was obtained. If one of the data source(s) (102) requires a login and password, the data source references (114) may include that information as well, or an indicator that such information is required. Depending on the type(s) of data source(s) (102) crawled, the data crawler (106) may obtain the software deliverables (116) from the data source(s) (102) by downloading the software deliverables (116) over a network connection, transferring the software deliverables (116) across a file subsystem, by any other electronic access method, or any combination thereof.

Further, to avoid storing redundant data components (112), the data crawler (106) may be configured to maintain a crawl history (104) of data source(s) (102) previously crawled. Because the data source(s) (102) may change over time (e.g., as web pages are updated, as new versions of the software deliverables (116) are released, etc.), the crawl history (104) may also indicate the times when the data source(s) (102) were most recently crawled. The data crawler (106) may be configured to use information stored in the crawl history (104) as a basis for regularly scheduled crawls of one or more of the data source(s) (102).

In one or more embodiments, the data crawler (106) is further configured to generate logical identifiers—in effect, digital 'fingerprints'—for each of the software deliverables (116) obtained, and store the logical identifiers in the crawl history (104). The logical identifiers may be compared with software deliverables encountered during crawling to determine whether those software deliverables are logically equivalent to the software deliverables (116) already obtained. In one or more embodiments, the use of logical identifiers in this manner prevents storage of redundant copies of the software deliverables (116). For example, the logical identifiers may be used to ensure that distinct versions of the software deliverables (116) are each obtained only once.

In one or more embodiments, the system (100) includes a data collector (108) configured to process information stored in the data components (112). Specifically, the data collector (108) may be configured to parse the software deliverables (116) to identify additional data source references. For example, one or more of the software deliverables (116) may include a uniform resource locator (URL) stored in a header file or in HTML that identifies the location of a related software deliverable. In such cases, the data collector (108) may be configured to identify the URL and forward the URL to the data crawler (106) for crawling. Those skilled in the art will appreciate that the software deliverables (116) may include many different types of references to data sources. Further, the data collector (108) may be configured to identify only certain types of references.

In one or more embodiments, the system (100) includes a data miner (110) configured to process the software deliverables (116). Specifically, the data miner (110) is configured to mine the software deliverables (116) to obtain metadata (118) about the software deliverables (116). 'Data mining' is a term of art referring to a broad category of methods and systems for extracting information from existing data. Data mining typically involves performing pattern recognition based on known data characteristics, such as extensible markup language (XML) schemas, HTML tags, commonly used text strings, identifiable data structures, file header formats, etc. In some cases, data mining may use a learning algorithm, whereby results of the pattern recognition are analyzed and used to enhance (i.e., broaden or narrow in scope) the pattern recognition itself. Those skilled in the art will appreciate that many different data mining techniques exist.

In one or more embodiments, the data miner (110) is configured to mine the software deliverables (116) for metadata (118) concerning the software deliverables' (116) various dependencies and conflicts, if any exist. For example, the metadata (118) may identify that a particular software deliverable requires a particular version of another software deliverable. Alternatively, the metadata (118) may identify that a particular software deliverable is explicitly incompatible with a particular version of another software deliverable. Those skilled in the art will appreciate that many different types of dependencies and conflicts exist. For example, some software deliverables are only compatible with specific operating systems or hardware platforms.

In one or more embodiments, the data miner (110) is configured to identify only specific types of dependencies and conflicts. Further, the specific types of dependencies and conflicts to mine for may be user-configurable via an administrative interface (not shown). In any case, the dependencies and conflicts identified by the data miner (110) are stored as metadata (118) associated with the software deliverables (116). In one or more embodiments, the metadata (118) also includes the data source references (114), thereby serving as a central access point for different types of information about the software deliverables (116).

The data miner (110) may further be configured to parse the data components (112) to identify individual software deliverables (116) to be mined. For example, one or more of the software deliverables (116), as obtained from the data source(s) (102), may be stored in an archive file (not shown) such as a zip file, a tape archive (tar) file, a cabinet (CAB) file, a Java® archive (JAR) file, etc. The data miner (110) may be configured to extract the individual software deliverables (116) from the archive file(s), so that the individual software deliverables (116) are available for data mining. Java® is a registered trademark of Sun Microsystems, Inc. of Santa Clara, Calif.

In one or more embodiments of the invention, only a single data crawler (106), a single data collector (108), and a single data miner (110) are used to perform the functions described above. Alternatively, multiple data crawlers, multiple data collectors, and/or multiple data miners may be used. For example, the data crawler (106) may be configured to instantiate separate data collectors for each of the software deliverables (116) obtained from the data source(s) (102). Further, the data collector (108) may be configured to instantiate separate data crawlers whenever additional data source references are identified. Moreover, multiple data miners may be used to individually process each of the software deliverables (116). Many different arrangements of data crawler(s), data collector(s), and data miner(s) may be used to accomplish the functions described herein.

Further, the crawl history (104), data components (112), and metadata (118) may be stored in many different types of storage locations. In one or more embodiments, the software deliverables (116) are stored as raw data in a file system, while the crawl history (104), data source references (114), and metadata (118) are stored in tables of a relational database. Alternatively, these components may be stored separately and/or in different types of storage locations. Filtered views, inventories, rules, and/or knowledge packages may also be stored in one or more of these storage locations. The aforementioned components are discussed in detail below with respect to FIGS. 2-4.

Figure 2:
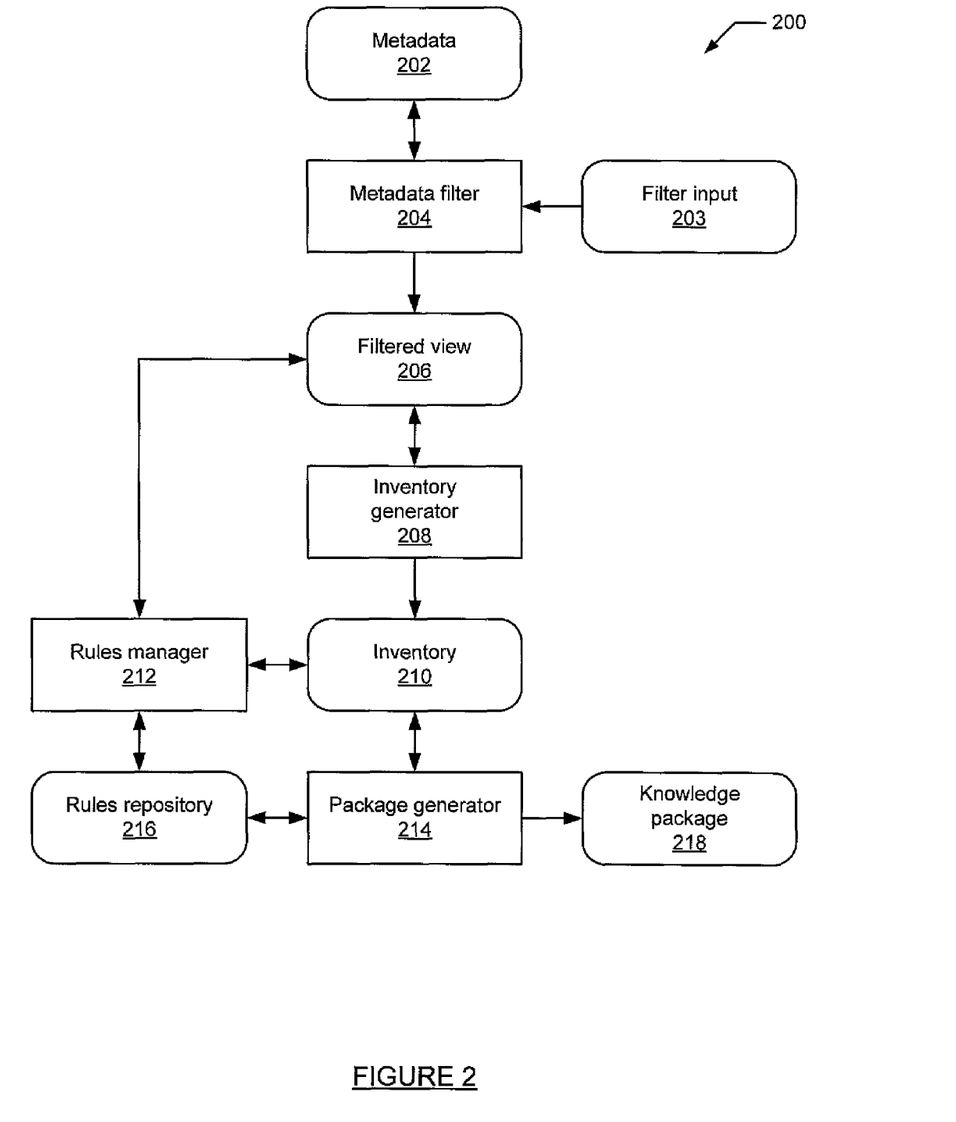

In one or more embodiments of the invention, metadata about software deliverables (e.g., metadata (118) of FIG. 1) is used as a basis for generating a knowledge package. FIG. 2 shows a diagram of a system (200) in accordance with one or more embodiments of the invention. Specifically, the system (200) is configured to use metadata (202) about software deliverables as input, and generate a knowledge package (218) as output.

In one or more embodiments, the knowledge package (218) includes guidelines for obtaining and installing software deliverables. Specifically, the guidelines may be associated with one or more particular software package(s). However, some of the software deliverables described by the metadata (202) may not be relevant to a given knowledge package (218). For example, some of the software deliverables may be associated with unrelated software packages or versions thereof. Accordingly, the system (200) may include a metadata filter (204) configured to generate a filtered view (206) of the metadata (202), where the filtered view (206) is restricted to metadata for a subset of software deliverables that are relevant to the knowledge package (218).

Specifically, in one or more embodiments, the filtered view (206) is based on filter input (203) to the metadata filter (204). In one or more embodiments, the filter input (203) specifies one or more software package(s) for which to generate guidelines, and the metadata filter (204) is configured to generate the filtered view (206) based on the specified software package(s). Alternatively, the filter input (203) may include membership criteria for filtering the metadata (202). For example, membership criteria may include date(s) when software deliverables were obtained, regular expressions to apply to file names, specific data sources, etc. The filter input (203) may come from a database, an XML file, manual user input, or any other data source, depending on the specific implementation of the metadata filter (204).

Further, in one or more embodiments, the system (200) includes an inventory generator (208) configured to generate an inventory (210) of software deliverables associated with the metadata included in the filtered view (206). The inventory generator (208) may generate the inventory (210) using the filtered view (206) itself as input, or may alternatively use a separate list or enumeration (not shown) of software deliverables to include in the inventory (210). In one or more embodiments, the inventory (210) is a listing of the subset of software deliverables relevant to the knowledge package (218), and does not include the actual software deliverables. In one or more embodiments, filtering the metadata (202) and generating the inventory (210) in this manner reduces the amount of subsequent processing required to generate the knowledge package (218).

Those skilled in the art will appreciate that merely knowing the software deliverables required for a software package may not be sufficient for correctly obtaining and installing the software package. In many cases, the software deliverables must be installed in a particular order. Further, some software deliverables may require particular configuration settings to operate correctly. If the correct installation order and configuration requirements are not respected, one or more software deliverables may fail to install and/or the software package may not operate correctly.

Accordingly, in one or more embodiments, the system (200) includes a rules manager (212) configured to process the inventory (210) and the filtered view (206) to generate a set of rules for obtaining and installing the required software deliverables correctly. The rules may specify data sources, installation priorities, configuration settings, etc. Further, in one or more embodiments, the rules manager (212) is configured to identify any software deliverables that should be added or removed from the inventory (210) based on the generated rules. In one or more embodiments, the rules are stored in a rules repository (216), and serve as a basis for a package generator (214) to generate the knowledge package (218). Examples of embodiments of the rules manager (212) and package generator (214) are discussed in detail below with respect to FIGS. 3 and 4.

Figure 3:
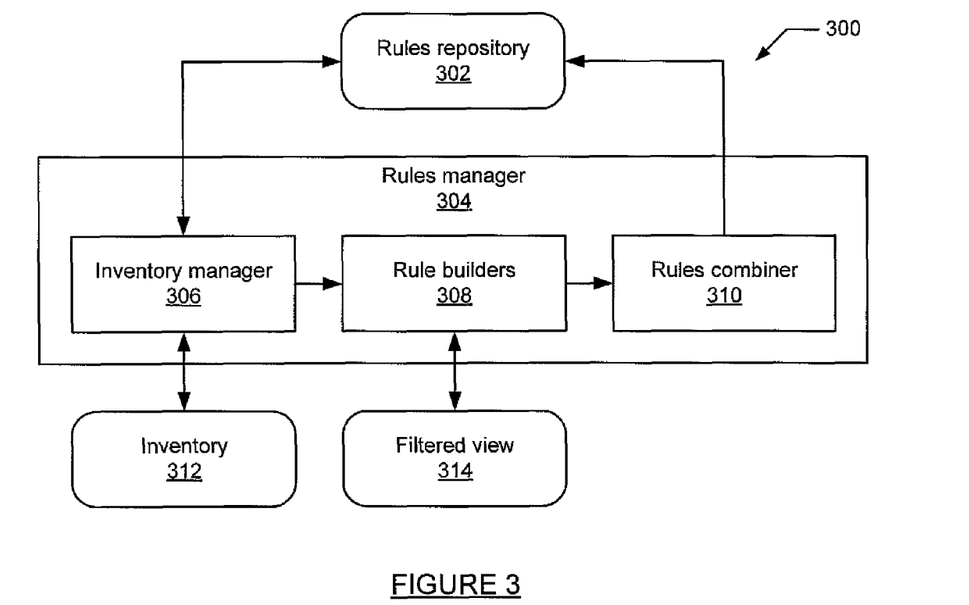

FIG. 3 shows a diagram of a system (300) in accordance with one or more embodiments of the invention. The system (300) includes a rules manager (304) configured to generate rules about obtaining and installing software deliverables. Specifically, the rules manager (304) is configured to generate the rules using an inventory (312) of software deliverables and a filtered view (314) of metadata about the software deliverables.

In one or more embodiments, the rules manager (304) includes an inventory manager (306) configured to initialize rule builders (308) for each software deliverable listed in the inventory (312). The rule builders (308), in turn, are configured to use the metadata (e.g., data source references, dependencies, conflicts, etc.) in the filtered view (314) to generate rules for obtaining and installing the individual software deliverables.

In one or more embodiments, the rules generated by the rule builders (308) are effectively component rules, i.e., rules that are each associated with individual software deliverable components of a software package. For example, a rule may indicate a data source where a given software deliverable can be obtained. If the data source requires a login and password, the rule may include that information as well, or an indication that such information is required. In one or more embodiments, placeholders for logins and passwords are provided so that a recipient of the knowledge package can enter their own access credentials. Further, a rule may list other software deliverables that a given software deliverable depends on, and may indicate if any software deliverables must be installed before or after the given software deliverable.

As discussed above, the rules generated by the rule builders (308) may be component rules. In one or more embodiments, the rule builders (308) are configured to forward component rules to a rules combiner (310). The rules combiner (310), in turn, is configured to combine component rules into rules for obtaining and installing the software package as a whole. For example, the rules combiner (310) may use component rules to identify an installation sequence for multiple software deliverables. In one or more embodiments, the rules combiner (310) is configured to store these rules into a rules repository (302) for later access.

In some cases, rules generated by the rules manager (304) may indicate relationships (e.g., dependencies, conflicts, etc.) of software deliverables listed in the inventory (312) with software deliverables that are not listed in the inventory (312). Further, a rule may indicate a conflict between software deliverables that are both listed in the inventory (312). Depending on the specific software deliverables listed in the inventory (312), many different types of inaccuracies in the inventory (312) may be identified by the rules.

In one or more embodiments, the inventory manager (306) is configured to process rules in the rules repository (302) to identify whether the aforementioned types of inaccuracies exist in the inventory (312). If inaccuracies do exist in the inventory (312), the inventory manager (306) may be configured to add or remove software deliverables from the inventory (312) to correct those inaccuracies. Further, the inventory manager (306) may be configured to initialize rule builders (308) to generate new rules based on changes to the inventory (312). For example, if a software deliverable is added to the inventory (312), the inventory manager (306) may initialize a rule builder to generate a rule for obtaining and installing that software deliverable. Further, because the filtered view (314) may also be inconsistent with the rules, the inventory manager (306) and/or rule builders (308) may be configured to update the metadata in the filtered view (314) accordingly.

In one or more embodiments, the rules manager (304) is configured to populate the rules repository (302) and update the inventory (312) iteratively, until the inventory (312) describes a closed subset of software deliverables—that is, a subset that fully satisfies the dependencies of the individual software deliverables included in the subset. In one or more embodiments, an iterative process such as that described above helps ensure that the knowledge package generated from the rules repository (302) includes all of the necessary information for fully and correctly installing the specified software package(s).

Figure 4:
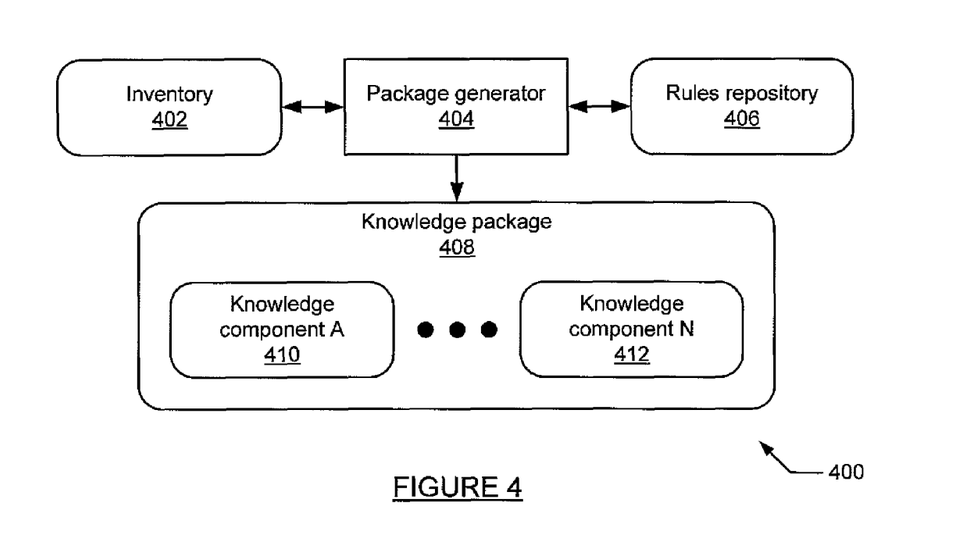

FIG. 4 shows a diagram of a system (400) in accordance with one or more embodiments of the invention. The system (400) includes a package generator (404) configured to generate a knowledge package (408) using an inventory (402) of software deliverables associated with one or more software package(s), and a rules repository (406) describing rules for obtaining and installing those software deliverables.

Specifically, in one or more embodiments, the package generator (404) is configured to obtain rules from the rules repository (406) for each of the software deliverables listed in the inventory (402). In one or more embodiments, the package generator (404) is configured to generate the knowledge package (408) by converting the rules into a standardized format suitable for distribution to users. For example, the knowledge package (408) may use the universal knowledge base (UKB) format by Sun Microsystems, Inc. In other words, the package generator (404) effectively translates the rules into guidelines that the user can follow to actually obtain and install the software package(s), either manually or via an automated processing of the knowledge package (408).

More specifically, in one or more embodiments, the knowledge package (408) includes multiple knowledge components (e.g., knowledge component A (410), knowledge component N (412)). Each knowledge component includes guidelines for obtaining and installing one or more of the software deliverables specified in the inventory (402). For example, knowledge components may include data source references, logins and passwords (or placeholders for such access credentials), installation parameters, configuration settings, etc. In one or more embodiments, the knowledge components are XML sub-trees in an XML file, and the guidelines for obtaining and installing the software deliverables are stored in XML tags in the XML sub-trees. Further, in one or more embodiments, the relationships between software deliverables represented in the knowledge package (408) define the order in which the software deliverables should be installed. Thus, the knowledge package (408) effectively includes guidelines for obtaining and installing the software package(s) as a whole.

Figure 5:
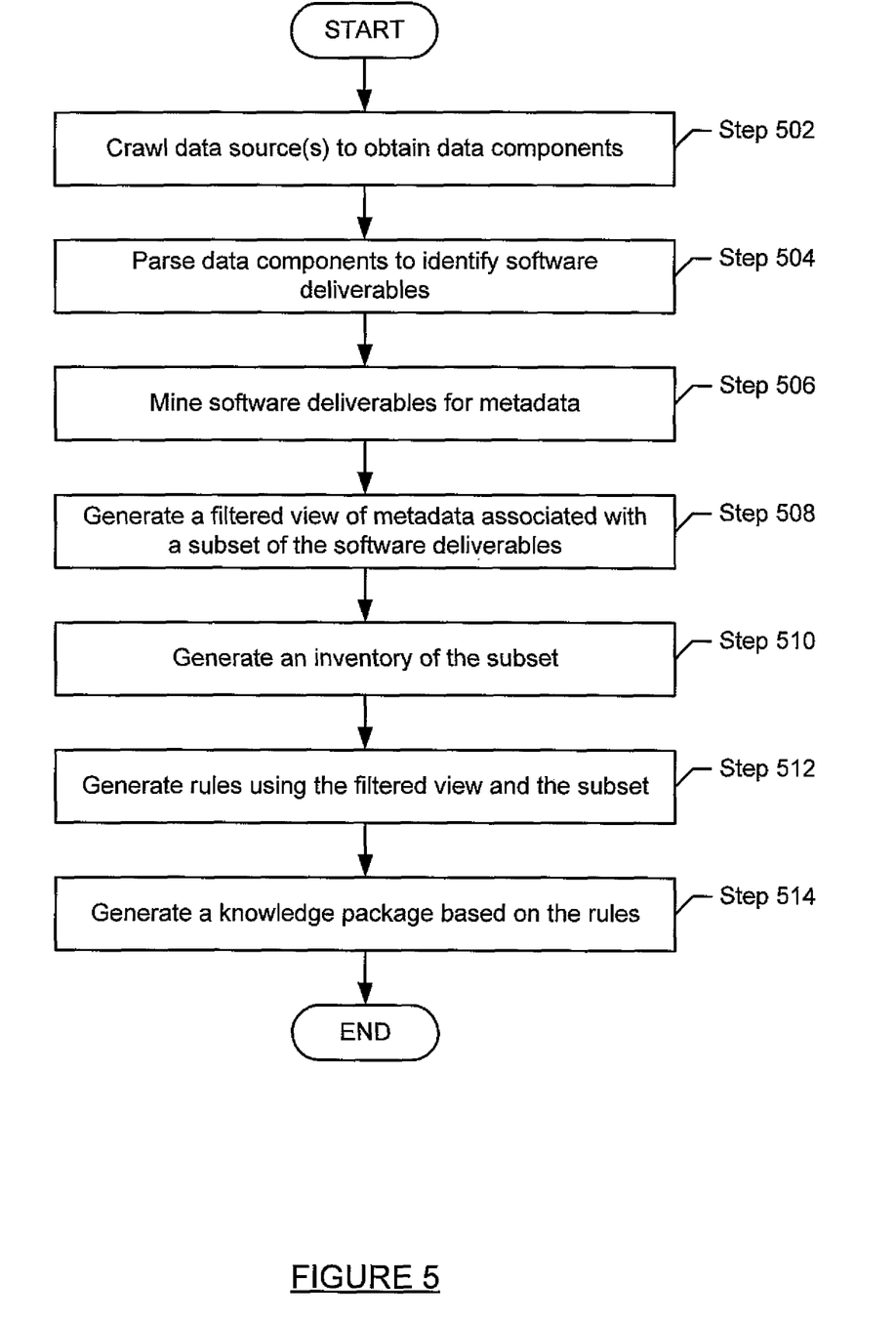
FIG. 5 shows a flowchart of a method for generating a knowledge package in accordance with one or more embodiments of the invention.

FIG. 5 shows a flowchart of a method for generating a knowledge package in accordance with one or more embodiments of the invention. In one or more embodiments of the invention, one or more of the steps shown in FIG. 5 may be omitted, repeated, and/or performed in a different order than the order shown in FIG. 5. Accordingly, embodiments of the invention should not be considered limited to the specific ordering of steps shown in FIG. 5.

In one or more embodiments of the invention, in Step 502, one or more data sources are crawled to obtain data components. The data components include copies of software deliverables associated with one or more software packages, and may also include data source references to the data source(s) where the software deliverables were obtained.

In one or more embodiments of the invention, in Step 504, data components are parsed to identify individual software deliverables. For example, as discussed above with respect to FIG. 1, the data components may include one or more archive files containing multiple software deliverables.

In one or more embodiments of the invention, in Step 506, individual software deliverables are mined for metadata. The metadata may include data source references or any other type of information about the software deliverables, including relationships to other software deliverables (e.g., dependencies, conflicts, etc.).

In one or more embodiments of the invention, in Step 508, a filtered view of the metadata is generated. As discussed above, the filtered view may be for a subset of the available software deliverables. In one or more embodiments, the subset is associated with one or more specific software packages. Further, in Step 510, an inventory of the subset is generated. The inventory is a listing of software deliverables in the subset.

In one or more embodiments of the invention, in Step 512, the filtered view of Step 508 and the inventory of Step 510 are used to generate rules about the subset of software deliverables. Specifically, the rules describe how to obtain and install the software deliverables. Subsequently, in Step 514, a knowledge package is generated based on those rules. The knowledge package includes guidelines for obtaining and installing the specified software package(s) as a whole.

Embodiments of the invention allow for the generation of a knowledge package that facilitates obtaining and installing a software package. Specifically, by using metadata about software deliverables in the software package to generate guidelines for the obtaining and installing the software package, embodiments of the invention reduce the amount of effort and knowledge required for users of the software package. Further, in one or more embodiments of the invention, a crawling mechanism is used to obtain the metadata, thereby further reducing the burden placed on the user. Moreover, because the rules take into account dependencies and conflicts between software deliverables, the guidelines in the knowledge package provide a high degree of reliability and certainty that the software package(s) will install and operate correctly.

Figure 6:
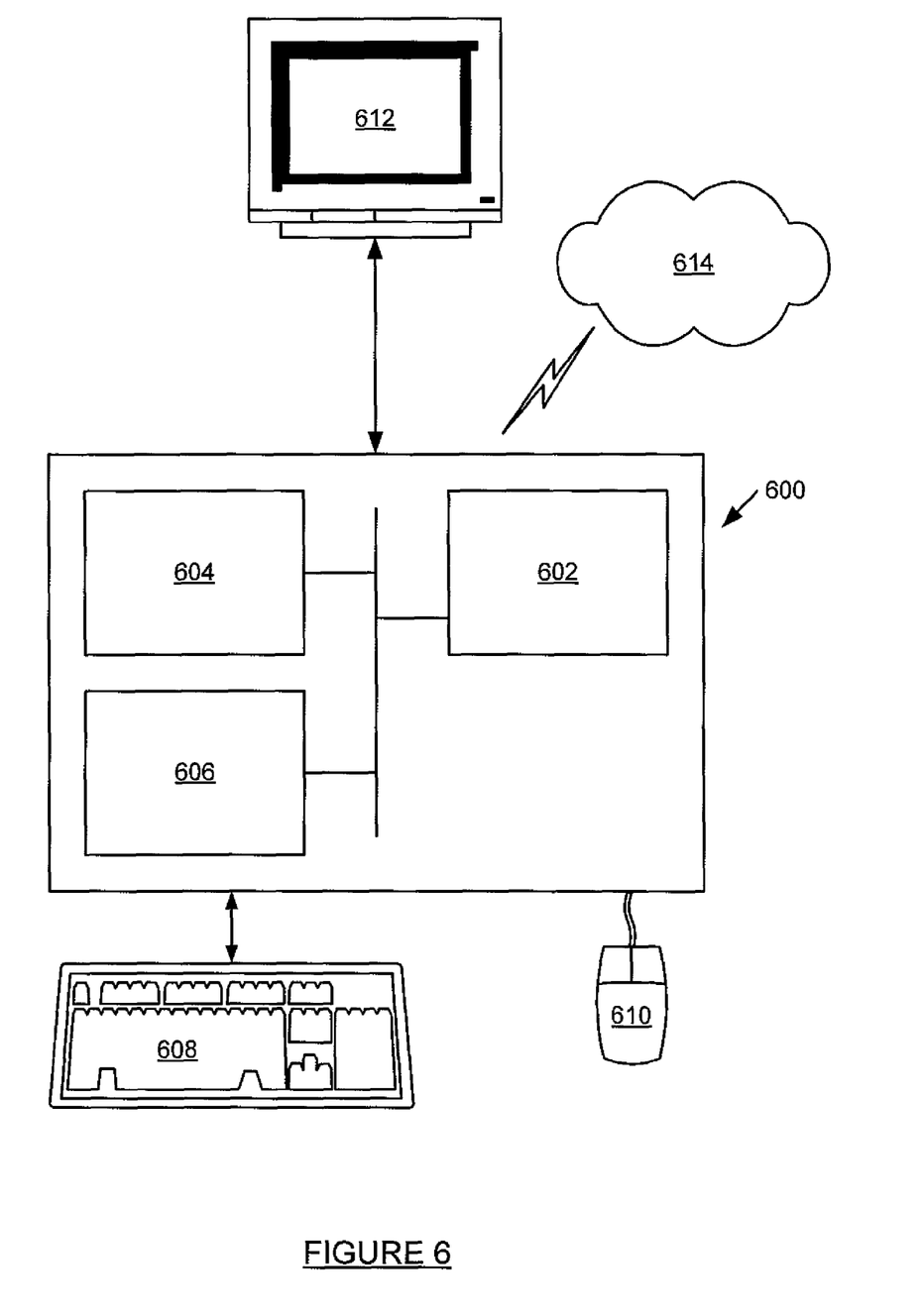
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a network (614) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (600)

may be located at a remote location and connected to the other elements over a network. Further, embodiments of the invention may be implemented on a distributed system having a plurality of nodes, where each portion of the invention (e.g., data source(s), crawl history, data crawler, data collector, data miner, metadata, data components, metadata filter, etc.) may be located on a different node within the distributed system. In one embodiment of the invention, the node is a computer system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
   a processor;
   at least one data miner configured, when executed by the processor, to:
      obtain a first data component of a plurality of data components for a software package, wherein the first data component comprises a first software deliverable and a first data source reference;
      mine, using pattern recognition, the first software deliverable to obtain a dependency relationship specifying that the first software deliverable requires a version of a second software deliverable;
      obtain a second data component of the plurality of data components, wherein the second data component comprises the version of the second software deliverable and a second data source reference;
      mine, using pattern recognition, the second software deliverable to obtain a conflict relationship specifying that the second software deliverable is incompatible with a third software deliverable;
      store the dependency relationship, the conflict relationship, the first data source reference, and the second data source reference in metadata for the software package;
   a metadata filter configured, when executed by the processor, to:
      identify, using the metadata for the software package, a subset of a plurality of software deliverables comprising the first software deliverable and the second software deliverable, wherein the identifying the subset is based on the dependency relationship described in the metadata for the software package; and
      generate, using the metadata for the software package, a filtered view of the metadata for the software package associated with the subset of the plurality of software deliverables;
   an inventory generator configured, when executed by the processor, to generate, using the subset, an inventory of the subset;
   a rules manager configured, when executed by the processor, to generate a plurality of rules using the filtered view and the inventory, wherein the plurality of rules is based on a plurality of software relationships within the subset;
   a package generator configured, when executed by the processor, to generate a knowledge package based on the plurality of rules, wherein the knowledge package comprises guidelines for obtaining the subset and installing the subset;
   at least one data collector configured, when executed by the processor, to:
      identify a plurality of data source references in the plurality of data components, wherein the plurality of data source references comprises the first data source reference and the second data source reference; and
      provide the plurality of data source references to at least one data crawler; and
   the at least one data crawler configured to crawl at least one data source to obtain the plurality of data components comprising the first data component and the second data component.

2. The computer system of claim 1, wherein the at least one data collector is further configured to:
   parse the plurality of data components to identify the plurality of software deliverables comprising the first software deliverable and the second software deliverable, and
   provide the plurality of software deliverables to the at least one data miner.

3. The computer system of claim 2, wherein the at least one data collector is configured to provide the plurality of data source references to the at least one data crawler by initializing a separate instance of the at least one data crawler for each data source reference in the plurality of data source references.

4. The computer system of claim 2, wherein the at least one data collector is configured to provide the plurality of software deliverables to the at least one data miner by initializing a separate instance of the at least one data miner for each software deliverable in the plurality of software deliverables.

5. The computer system of claim 2, wherein the at least one data crawler is further configured to initialize a separate instance of the at least one data collector for each data component in the plurality of data components.

6. The computer system of claim 1, wherein the guidelines for obtaining the subset comprise the first data source reference referencing the at least one data source.

7. The computer system of claim 1, further comprising:
   a rules repository configured to store the plurality of rules, wherein the rules manager comprises:
      a plurality of rule builders configured to generate a plurality of component rules associated with the plurality of software deliverables comprising the first software deliverable and the second software deliverable;
      a rules combiner configured to:
         combine the plurality of component rules to form the plurality of rules, and
         store the plurality of rules in the rules repository; and
      an inventory manager configured to initialize a rule builder selected from the plurality of rule builders for each software deliverable in the plurality of software deliverables.

8. The computer system of claim 1, wherein the subset comprises software deliverables for the software package selected from a group consisting of an operating system, an operating system patch, an operating system update, a software application, a software application patch, and a software application update.

9. The computer system of claim 1, wherein the inventory is a closed inventory listing every software deliverable necessary to deploy the software package.

10. The computer system of claim 1, wherein the dependency relationship and the conflict relationship are a subset of the plurality of software relationships.

11. A non-transitory computer readable medium comprising executable instructions, which when executed by a processor perform a method, the method comprising:
- obtaining a first data component of a plurality of data components for a software package, wherein the first data component comprises a first software deliverable and a first data source reference;
- mining, using pattern recognition, the first software deliverable to obtain a dependency relationship specifying that the first software deliverable requires a version of a second software deliverable;
- obtaining a second data component of the plurality of data components, wherein the second data component comprises the version of the second software deliverable and a second data source reference;
- mining, using pattern recognition, the second software deliverable to obtain a conflict relationship specifying that the second software deliverable is incompatible with a third software deliverable;
- storing the dependency relationship, the conflict relationship, the first data source reference, and the second data source reference in metadata for the software package;
- identifying, using the metadata for the software package, a subset of a plurality of software deliverables comprising the first software deliverable and the second software deliverable, wherein the identifying the subset is based on the dependency relationship described in the metadata for the software package;
- generating, using the metadata for the software package, a filtered view of the metadata for the software package associated with the subset of the plurality of software deliverables;
- generating, using the subset, an inventory of the subset;
- generating a plurality of rules using the filtered view and the inventory, wherein the plurality of rules is based on a plurality of software relationships within the subset;
- generating a knowledge package based on the plurality of rules, wherein the knowledge package comprises guidelines for obtaining the subset and installing the subset;
- crawling at least one data source to obtain the plurality of data components;
- identifying a plurality of data source references in the plurality of data components, wherein the plurality of data source references comprises the first data source reference and the second data source reference; and
- crawling a plurality of data sources referenced by the plurality of data source references.

12. The non-transitory computer readable medium of claim 11, the method further comprising:
- parsing the plurality of data components to identify the plurality of software deliverables comprising the first software deliverable and the second software deliverable for mining the plurality of software deliverables.

13. The non-transitory computer readable medium of claim 11, wherein generating the plurality of rules comprises:
- generating a plurality of component rules associated with the plurality of software deliverables comprising the first software deliverable and the second software deliverable;
- combining the plurality of component rules to form the plurality of rules; and
- storing the plurality of rules.

\* \* \* \* \*